| (12) | United States Patent | (10) Patent No.: | US 11,005,407 B2 |
|---|---|---|---|
| | Tomita et al. | (45) Date of Patent: | May 11, 2021 |

(54) DATA OBTAINING METHOD, INVERTER, AND ROTATING ELECTRIC MACHINE

(71) Applicant: Hitachi Industrial Equipment Systems Co., Ltd., Tokyo (JP)

(72) Inventors: Toshio Tomita, Tokyo (JP); Kenichi Saito, Tokyo (JP); Yuuta Iwase, Tokyo (JP); Masahiro Sano, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/625,907

(22) PCT Filed: Sep. 29, 2017

(86) PCT No.: PCT/JP2017/035558
§ 371 (c)(1),
(2) Date: Dec. 23, 2019

(87) PCT Pub. No.: WO2019/064512
PCT Pub. Date: Apr. 4, 2019

(65) Prior Publication Data
US 2020/0153376 A1 May 14, 2020

(51) Int. Cl.
*H02P 6/14* (2016.01)
*H02P 27/08* (2006.01)

(52) U.S. Cl.
CPC .................................. *H02P 27/085* (2013.01)

(58) Field of Classification Search
CPC ........ H02P 21/06; H02P 25/022; H02P 27/06; H02P 21/22; H02P 2207/05; H02P 27/085
See application file for complete search history.

(56) References Cited

U.S. PATENT DOCUMENTS

| 2001/0026764 A1 | 10/2001 | Ogawa et al. |
| 2007/0132415 A1* | 6/2007 | Patel ................... H02P 25/03 |
| | | 318/432 |
| 2014/0074427 A1 | 3/2014 | Ottewill et al. |

FOREIGN PATENT DOCUMENTS

| JP | 11-332298 A | 11/1999 |
| JP | 2001-286112 A | 10/2001 |
| JP | 2005-94826 A | 4/2005 |

(Continued)

OTHER PUBLICATIONS

International Search Report (PCT/ISA/210) issued in PCT Application No. PCT/JP2017/035558 dated Jan. 9, 2018 with English translation (two (2) pages).

(Continued)

*Primary Examiner* — Karen Masih
(74) *Attorney, Agent, or Firm* — Crowell & Moring LLP (57) ABSTRACT

Provided are a data obtaining method, an inverter, and a rotating electric machine capable of managing the operation state of a device without complicating the configuration thereof. Therefore, the data obtaining method uses an inverter for controlling a synchronous electric motor, wherein a position/speed calculation unit of the inverter calculates an electric angle of the synchronous electric motor from the value of the current flowing between the synchronous electric motor and the inverter and obtains data for each electric angle by sampling internal data within the inverter, said internal data being used for controlling the synchronous electric motor in synchronization with the information of the electric angle.

11 Claims, 9 Drawing Sheets

(56) References Cited

FOREIGN PATENT DOCUMENTS

JP         2010-98852 A     4/2010
JP         2014-516154 A     7/2014

OTHER PUBLICATIONS

English translation of document C2 (Japanese-language Written Opinion (PCT/ISA/237) issued in PCT Application No. PCT/JP2017/035558 dated Jan. 9, 2018), filed on Dec. 23, 2019 (seven (7) pages).
Extended European Search Report issued in European Application No. 17927625.8 dated Mar. 9, 2021 (nine (9) pages).

\* cited by examiner

DATA OBTAINING METHOD, INVERTER, AND ROTATING ELECTRIC MACHINE

TECHNICAL FIELD

The present invention relates to a data obtaining method, an inverter, and a rotating electric machine, and particularly relates to abnormality detection of a machine device, which performs a periodic operation, driven using the rotating electric machine.

BACKGROUND ART

For example, a rolling mill in a steel plant, etc. as a machine device driven using a rotating electric machine may cause suspension of an operation of a production line or the entire plant when the rolling mill stops due to a failure. Suspension of a facility due to occurrence of accidental abnormality is significantly damaging. For this reason, it is necessary to detect an abnormality and perform preventive maintenance before a failure leading to facility suspension occurs, and there are various technologies for detecting an abnormality before a failure occurs.

In general, to detect a state of a target machine device in detail, various sensors are attached, and data obtained therefrom is analyzed in detail to determine the state. In addition, by continuing these operations over a long period of time, changes in the state of each part over time are managed, and preventive maintenance is performed before an abnormality occurs.

Normally, these abnormality detection systems include a measuring instrument independent from equipment and a dedicated analyzer, and thus are intended only for an important facility that requires constant monitoring.

Examples of a background art in this technical field include Patent Document 1. Patent Document 1 discloses an apparatus including means for measuring a plurality of current and/or voltage signals of an electromechanical system, means for measuring an angular position of a target rotating shaft of the electromechanical system or means for estimating a value of a discrete angular position of a target rotating shaft of the electromechanical system, means for synchronizing a plurality of current and/or voltage signals with a scaled angular displacement of the rotating shaft, means for dividing a plurality of synchronous electric signals into a plurality of sections corresponding to each complete rotation of the rotating shaft, means for averaging a plurality of synchronous electric signals of several sections, means for extracting characteristic data of a size from a plurality of values of average synchronous electric signals and comparing the extracted characteristic data of the size with a threshold value given as a limit value, and means for alerting a user when the limit value is exceeded.

CITATION LIST

Patent Document

Patent Document 1: JP 2014-516154 A

SUMMARY OF THE INVENTION

Problems to be Solved by the Invention

Patent Document 1 is intended for an electromechanical system driven by an asynchronous induction motor, and proposes a method of outputting an alarm by associating the angular displacement of the rotating shaft with various electrical data such as the current and voltage of the motor, dividing an angle of the rotating shaft into a plurality of ranges, taking an average within the section, obtaining an average synchronous electrical signal, and then performing processing and analysis. However, after collecting data using various sensors, such as the current, voltage, and rotation speed of the motor, it is necessary to install new equipment such as various sensors and a state monitoring data analyzer to analyze the data. In addition, it is necessary to sample various sensor data such as current and voltage in synchronization with the angular displacement of the rotating shaft, which requires high-speed processing. Thus, it is necessary to use dedicated equipment. Therefore, it has not been considered that an apparatus configuration becomes complicated and expensive.

Therefore, a technology for managing an operating state of the apparatus without complicating the configuration is desired.

Solutions to Problems

In view of the above-described background art and problem, as an example, the invention is a data obtaining method by an inverter that controls a synchronous electric motor, including calculating, by a position/speed calculation unit of the inverter, an electric angle of the synchronous electric motor from a current value between the synchronous electric motor and the inverter, and acquiring data for each electric angle by sampling internal data present in the inverter for controlling the synchronous electric motor in synchronization with electric angle information.

Effects of the Invention

According to the invention, it is possible to provide a data obtaining method, an inverter, and a rotating electric machine capable of providing sign monitoring means of an electromechanical system using a minimum equipment configuration.

MODE FOR CARRYING OUT THE INVENTION

Hereinafter, an embodiment of the invention will be described with reference to drawings.

Embodiment

Figure 1:
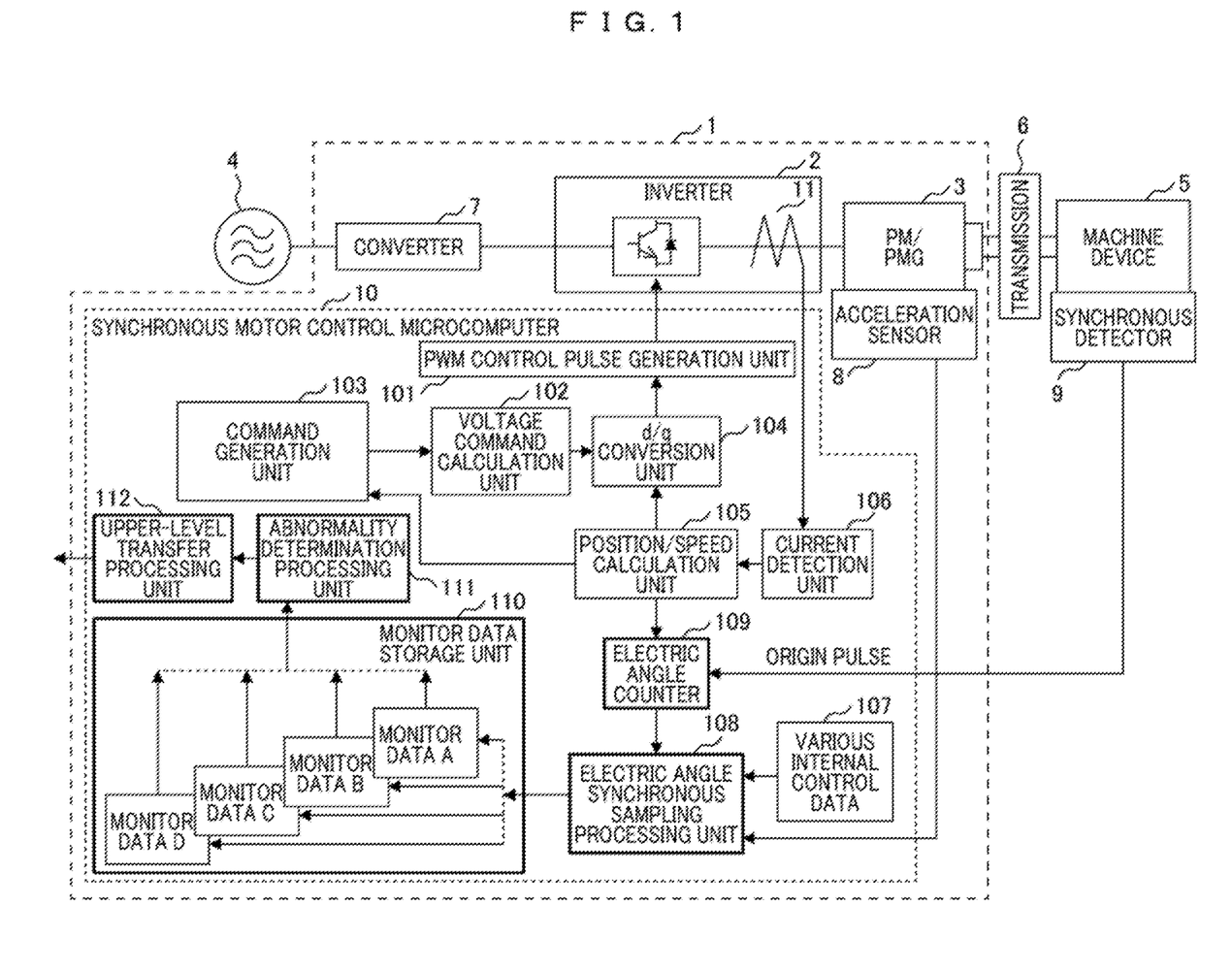
FIG. 1 is a configuration block of an electromechanical system using a rotating electric machine assembly according to an embodiment to which the invention is applied.
Figure 2:
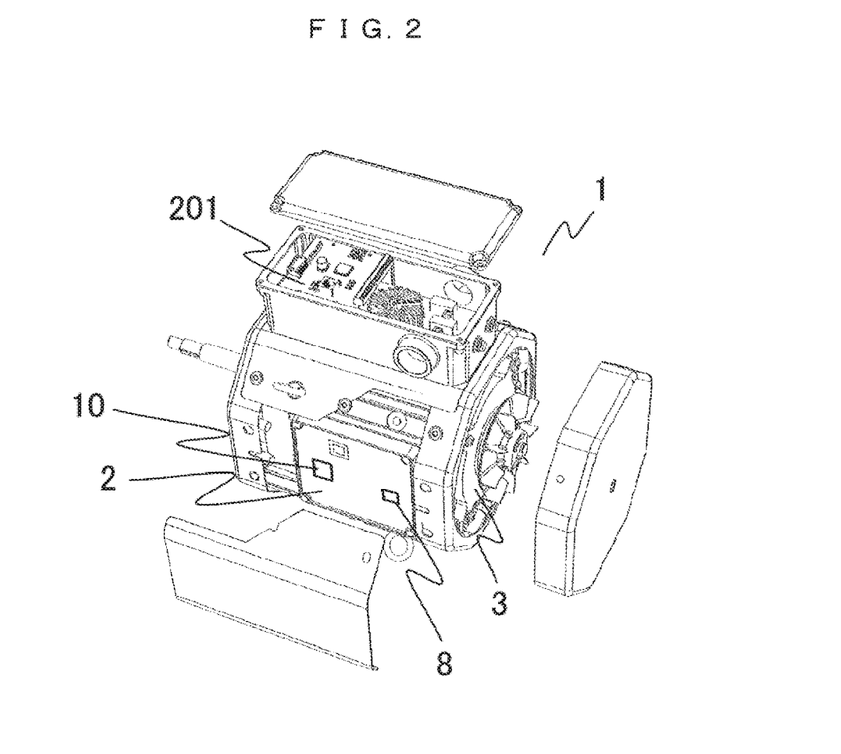
FIG. 2 is an external view of the rotating electric machine assembly according to the present embodiment.

FIG. 1 is a configuration block of an electromechanical system using a rotating electric machine in the present embodiment. Incidentally, hereinafter, the rotating electric machine is referred to as a rotating electric machine assembly. In addition, in FIG. 1, a part enclosed with a broken line is the rotating electric machine assembly 1, and an external appearance thereof is illustrated in FIG. 2. In FIG. 2, the rotating electric machine assembly 1 includes a permanent magnet type synchronous electric motor 3 and an inverter 2 for driving the synchronous electric motor therein. The inverter 2 is equipped with a synchronous motor control microcomputer 10 and an acceleration sensor 8 which are control devices for the synchronous electric motor. Normally, these components are fixed by a filler, etc. so as to be directly fixed to the permanent magnet type synchronous electric motor 3 which is a mechanical component, and consideration is given to avoid unnecessary resonance caused by an operation of the electric motor. In this way, there is an effect that vibration information of the electric motor and the electromechanical system fixed by a shaft of the electric motor is directly transmitted to the acceleration sensor 8. In addition, the rotating electric machine assembly 1 is equipped with an external communication interface 201, which enables various data to be exchanged between the synchronous motor control microcomputer 10 and an external device through mutual communication.

Hereinafter, details of the electromechanical system in the present embodiment will be described with reference to FIG. 1. In FIG. 1, the rotating electric machine assembly 1 includes a converter 7, the inverter 2, and the permanent magnet type synchronous electric motor 3 therein, and the inverter 2 includes a semiconductor switching element (not illustrated) and the synchronous motor control microcomputer 10 which is a control device that controls turning ON/OFF of the semiconductor switching element. Further, a PWM control pulse is generated from a command value, and the semiconductor switching element is turned ON/OFF by the PWM control pulse, thereby controlling a voltage applied to the permanent magnet type synchronous electric motor 3. In addition, a shaft output of the rotating electric machine assembly 1 drives a machine device 5 such as a compressor via a transmission 6.

In the synchronous motor control microcomputer 10, after a command from a command generation unit 103 that generates a command value such as a speed command or a torque command is converted into a voltage command by a voltage command calculation unit 102, a PWM signal is generated by a PWM control pulse generation unit 101 via a d/q conversion unit 104 to drive the inverter 2.

In addition, a position/speed calculation unit 105 calculates an axial phase angle, that is, an electric angle of the permanent magnet type synchronous electric motor 3 using an instantaneous current value from a current detector 11 in the inverter 2 to perform synchronous control.

In the present embodiment, when the permanent magnet type synchronous electric motor 3 is driven, a method of estimating and controlling a magnetic pole position from current and voltage information without using a shaft position detector is adopted.

Since the synchronous motor control microcomputer 10 estimates and controls the electric angle of the permanent magnet type synchronous electric motor 3 included therein in real time, a virtual synchronous electric motor model under control is present. Since control is performed so that a phase difference between this model and the actual permanent magnet type synchronous electric motor 3 is zero at all times, a virtual synchronous machine model reproduces the permanent magnet type synchronous electric motor 3 almost accurately. When the phase difference between the virtual model and the actual synchronous electric motor increases, synchronization is lost, the control of the synchronous machine becomes impossible, and the control stops. Therefore, during normal operation, the virtual model indicates a state of the actual permanent magnet type synchronous electric motor 3 almost accurately.

Furthermore, since the synchronous machine is used, there is no slip as that of an asynchronous induction motor, and thus an axial phase of the driven machine device and a phase of the virtual model under control are synchronized at all times.

For this reason, the electric angle under control can be associated with the axial phase of the machine device 5, and thus the synchronous motor control microcomputer 10 can manage the axial phase of the machine device 5 as the controlled electric angle.

Specifically, electric angle information of the position/speed calculation unit 105 is input to an electric angle counter 109 and a trigger signal for synchronous data sampling is generated to an electric angle synchronous sampling processing unit 108.

The electric angle synchronous sampling processing unit 108 samples various internal data for driving the synchronous electric motor and data from the acceleration sensor using a trigger signal, and then saves and stores the data in the monitor data storage unit 110.

When sampling of synchronous monitor data for one operation cycle of a mechanical system is completed, the data is determined by an abnormality determination processing unit 111. In the case of determining that there is an abnormality, the synchronous data is transferred to an upper-level control device via an upper-level transfer processing unit 112. Incidentally, a process of regularly transferring the synchronous data to the upper-level control device and determining an abnormality on the upper-level control device side may be adopted.

In a case in which the operation cycle of the machine device 5 is unknown, irregular, etc., by inputting an origin pulse output from a synchronous detector 9, etc. of the machine device 5 to the electric angle counter 109, it is possible to match a trigger start of synchronous data sampling with an origin of the machine device.

Data to be subjected to synchronous sampling includes a torque current, a DC voltage, an angular velocity, acceleration of each shaft, and a temperature change by a temperature sensor (not illustrated), etc.

Next, a description will be given of a relationship between an electric angle interval corresponding to one operation cycle of the machine device and the number of pieces of sampling data, and a method of sampling a large amount of synchronous data while executing control of the synchronous electric motor using an example of a reciprocating compressor.

Figure 3:
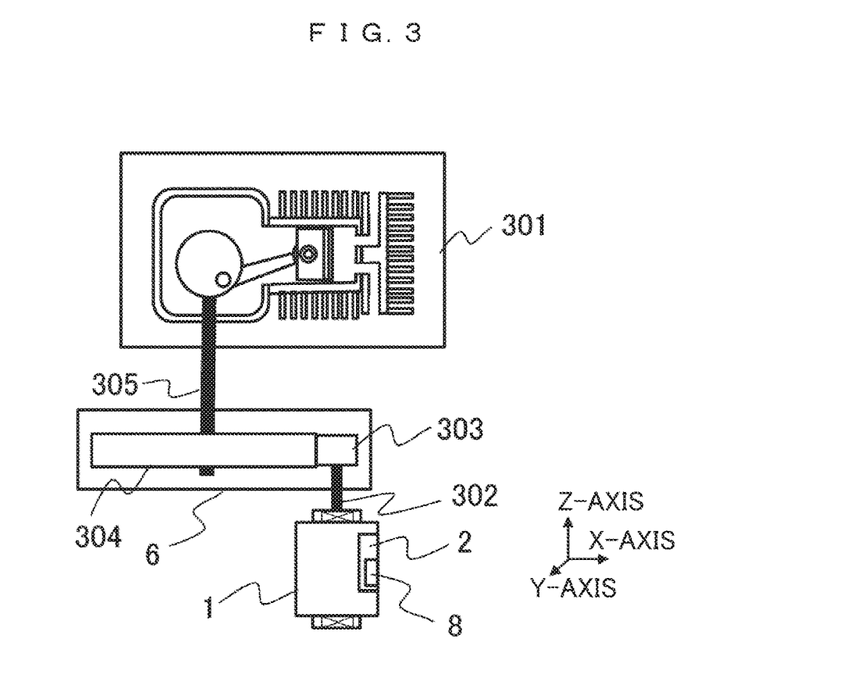
FIG. 3 is a system configuration diagram for driving a reciprocating compressor using the rotating electric machine assembly according to the present embodiment.

FIG. 3 is a system configuration diagram for driving a reciprocating compressor 301 using the rotating electric machine assembly 1, for example, via a 10:1 transmission (reduction gear) 6. For example, a permanent magnet type synchronous electric motor having four pole pairs and a rated number of rotations of 3,600 rpm is installed in the rotating electric machine assembly 1. In FIG. 3, a drive gear 303 connected to an electric motor shaft 302 of the permanent magnet type synchronous electric motor and a driven gear 304 meshing with the drive gear 303 reduce a speed of the mechanical shaft 305 connected to the driven gear 304 so that the mechanical shaft 305 rotates at 1/10 of the number of rotations of the electric motor shaft 302. Further, the reciprocating compressor 301 is a single-cylinder piston type compressor that performs one cycle of the compression process when the mechanical shaft 305 rotates once.

Figure 4:
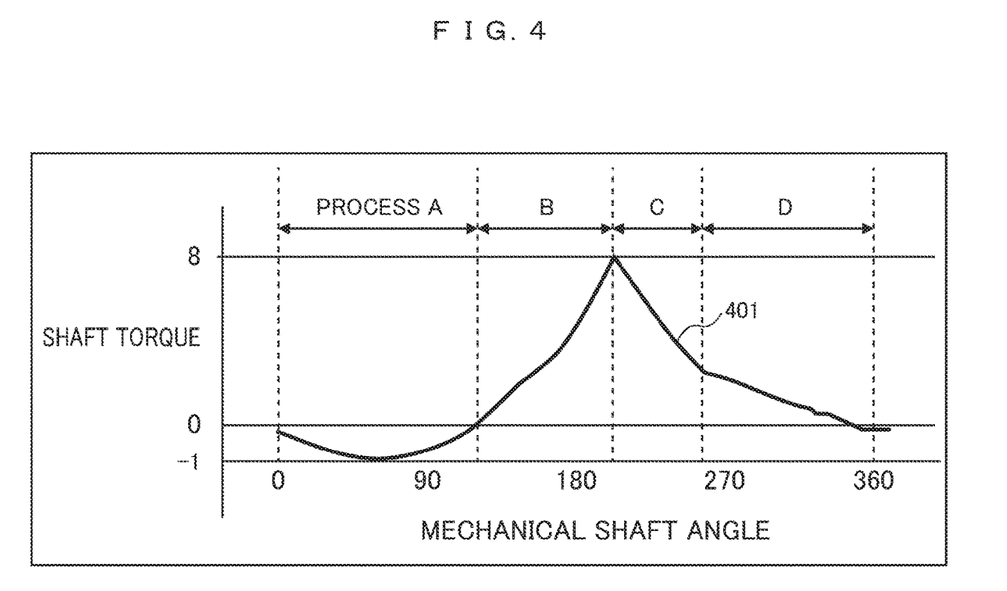
FIG. 4 is a diagram illustrating a torque characteristic in one cycle of a compression process of the reciprocating compressor according to the present embodiment.

FIG. 4 illustrates a torque characteristic 401 for one rotation of the mechanical shaft of the reciprocating compressor, that is, one cycle of the compression process. As illustrated in FIG. 4, there are roughly four operation processes A to D, and a load has a periodicity that repeats this operation every time the mechanical shaft 305 rotates.

Figure 5:
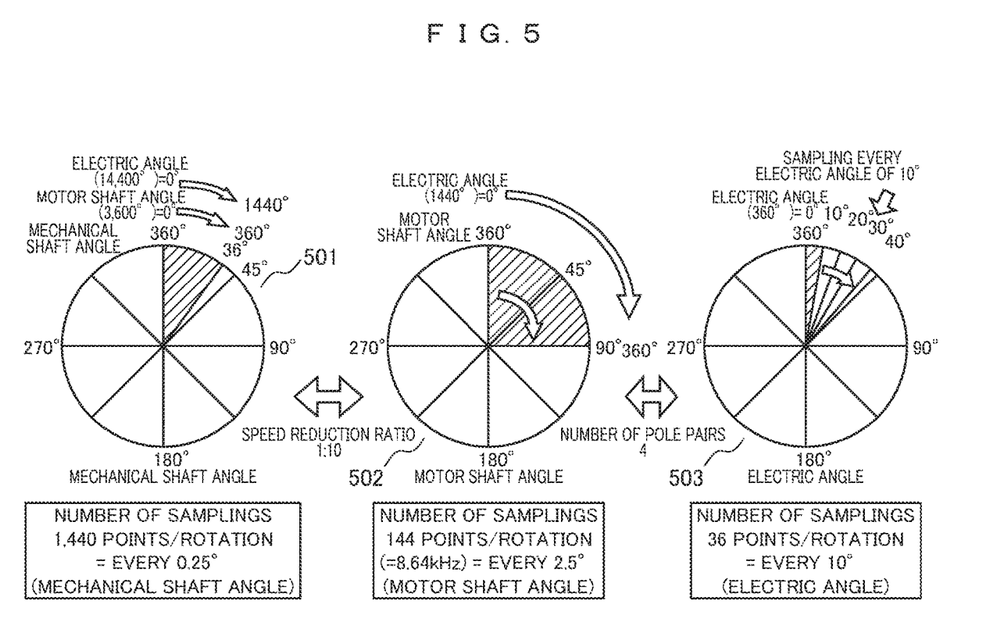
FIG. 5 is a diagram illustrating a relationship among a mechanical shaft angle, a motor shaft angle, and an electric angle according to the present embodiment.

FIG. 5 illustrates a relationship among a mechanical shaft angle 501 corresponding to an angle of the mechanical shaft 305 of the reciprocating compressor, an angle of the electric motor shaft 302 of the rotating electric machine assembly, that is, a motor shaft angle 502, and an electric angle 503 under control of the synchronous electric motor. In the present embodiment, data is sampled every electric angle of 10°. For this reason, when the electric angle 503 is 360°, a total of 36 points are sampled at every 10°. In addition, since the electric motor has four pole pairs, 360° of the motor shaft angle 502 of the rotating electric machine assembly corresponds to 1,440° of the electric angle. For this reason, the number of samplings at the motor shaft angle of 360° is 144 points every 2.5°. Furthermore, since the reciprocating compressor is driven via a 10:1 reduction gear, the number of samplings at the mechanical shaft angle of 360° of the reciprocating compressor is 1,440 points in total every 0.25°. Therefore, since various types of synchronous monitor data are obtained every 0.25° with respect to the mechanical shaft angle of the machine device, it is possible to comprehend a significantly detailed state of the machine device.

Figure 6:
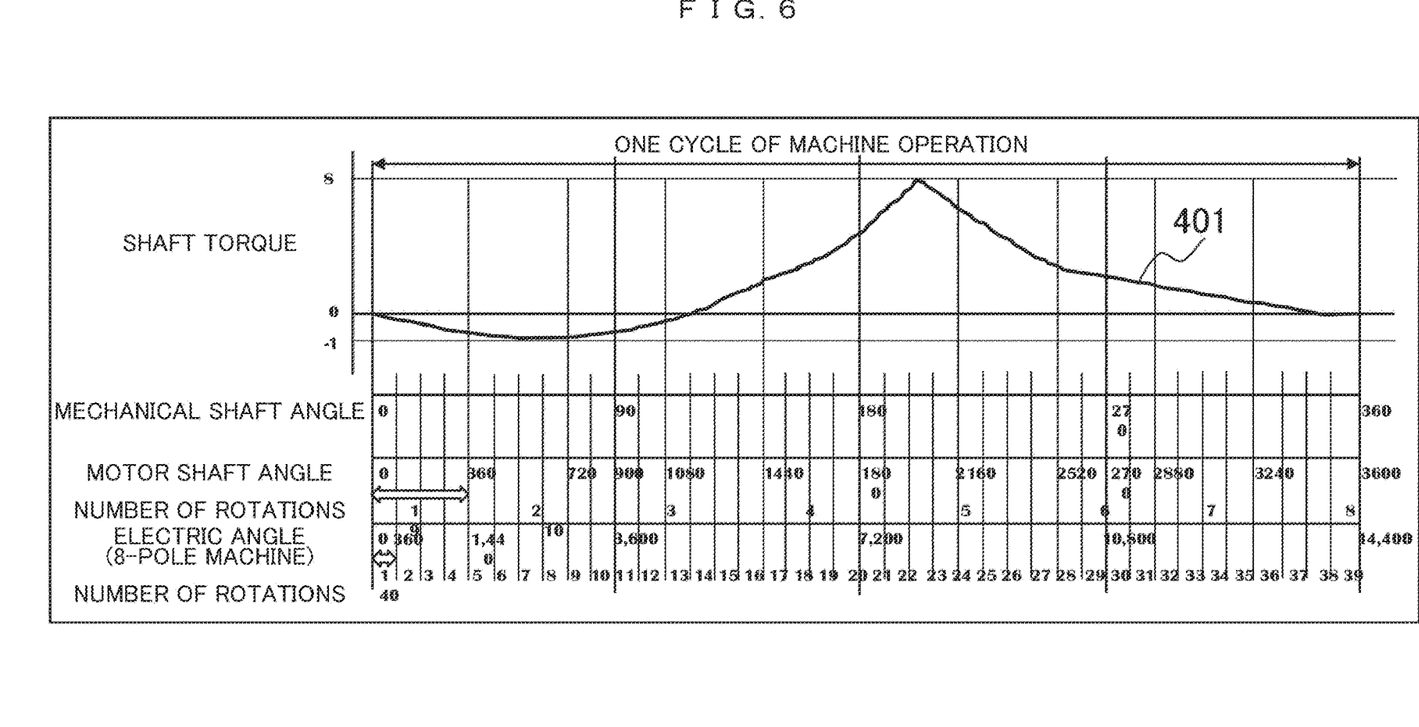
FIG. 6 is a diagram illustrating a relationship between one cycle of the compression process of the reciprocating compressor according to the present embodiment and a mechanical shaft angle, a motor shaft angle, and an electric angle.

FIG. 6 illustrates a relationship between one operation cycle of the reciprocating compressor and a mechanical shaft angle, a motor shaft angle, and an electric angle. As illustrated in FIG. 6, the motor shaft angle of the rotating electric machine assembly corresponds to 10 rotations in one operation cycle of the compressor, that is, one rotation of the mechanical shaft, and corresponds to 40 rotations at the electric angle. That is, one rotation of the mechanical shaft of the reciprocating compressor corresponds to an electric angle of 14,400°. When sampling is performed at every electric angle of 10°, the number of samplings in one operation cycle of the reciprocating compressor is 36×40=1,440 points.

Here, it is necessary to perform sampling of various data in an electric motor control process of a synchronous electric motor control microcomputer. However, in sampling at every 10° of the electric angle, the cycle becomes short, and thus original synchronous control of the electric motor is affected by a control delay, etc. In particular, when an interval of the electric angle is changed from 10° to 1°, etc., it is presumed that a load of the sampling process becomes heavy and normal synchronization control may not be continued. With respect to this problem, in the present embodiment, focusing on the fact that the operation of the machine device such as the operation of the reciprocating compressor has a repetitive periodicity, sampling is not performed as synchronization data at every 10° of the electric angle at a time, and one point is sampled at every 360° (one rotation) of the electric angle.

Figure 7:
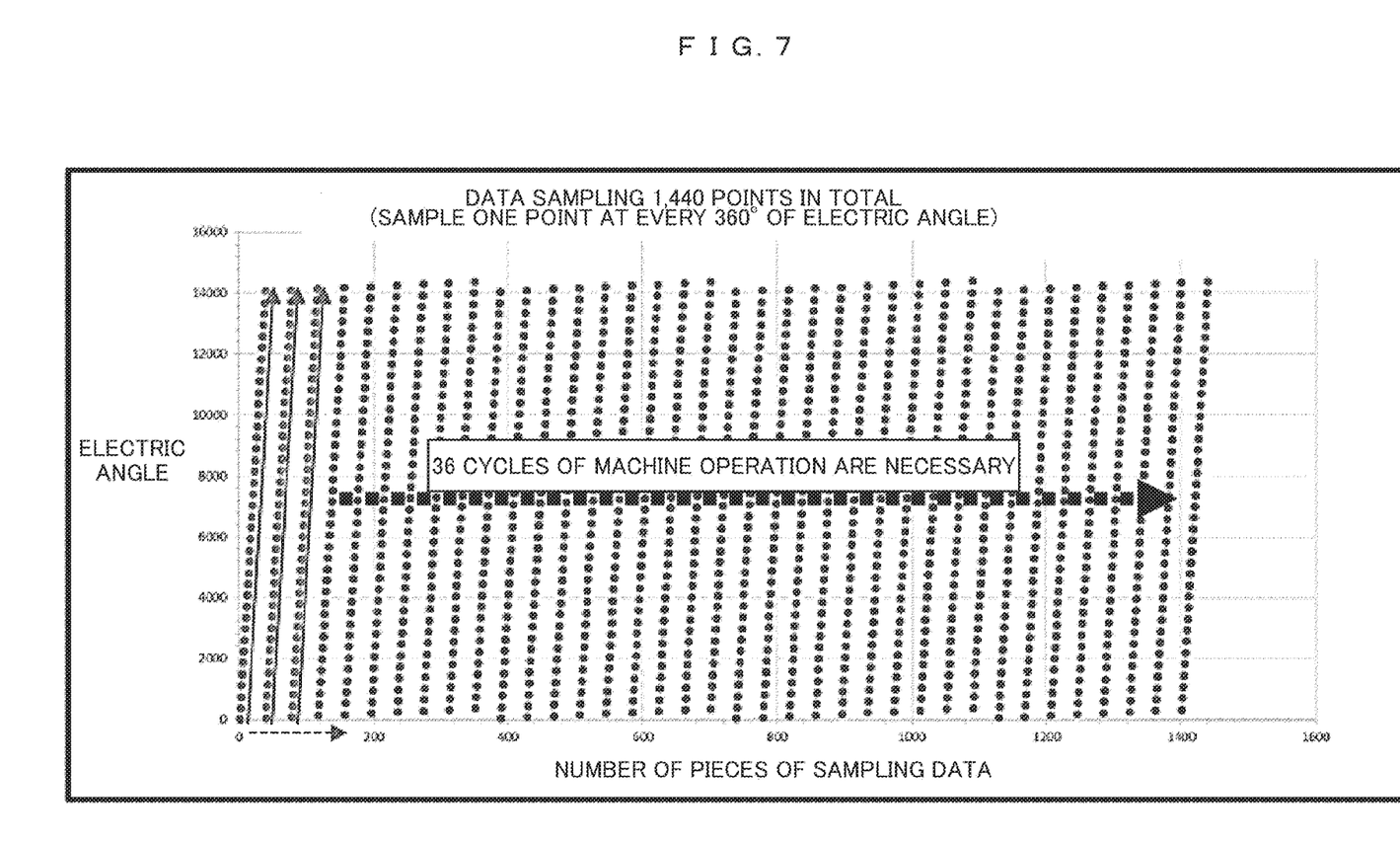
FIG. 7 is a diagram illustrating a relationship between an electric angle and the number of pieces of sampling data in one cycle of the compression process according to the present embodiment.

FIG. 7 is a diagram illustrating a relationship between an electric angle and the number of pieces of sampling data in one cycle of the compression process.

That is, to sample data of 1,440 points at every 10° of the electric angle, 1,440×360=518,400° (electric angle) at the electric angle.

When converted into the motor shaft angle, 518,400/4=129,600°.

In addition, since the reciprocating compressor is driven via a 10:1 reduction gear, the mechanical shaft angle is 129,600/10=12,960°.

The number of rotations of the mechanical shaft is 12,960/360=36 rotations.

Therefore, synchronous sampling of the above 1,440 points is completed by 36 rotations of the reciprocating compressor, that is, 36 cycles of the compression process.

When the rotating electric machine assembly is operated at the rated 3,600 rpm, a time required for sampling 1,440 points is (36*10)/3,600=0.1 min=6 sec, and sampling of 1,440 points is completed in 6 seconds.

Therefore, it can be seen that a sampling period in the case of operating at 3,600 rpm is 1,440/6=240 Hz, which is a sufficiently small value with respect to a maximum value 400 Hz of an output data rate of the acceleration sensor, for example. Similarly, a sufficient interval can be provided for a time for AD conversion of various sensor outputs. In this way, by using the fact that the machine device has a repetitive periodicity, it is possible to sample the number of pieces of necessary data in time division.

Figure 8:
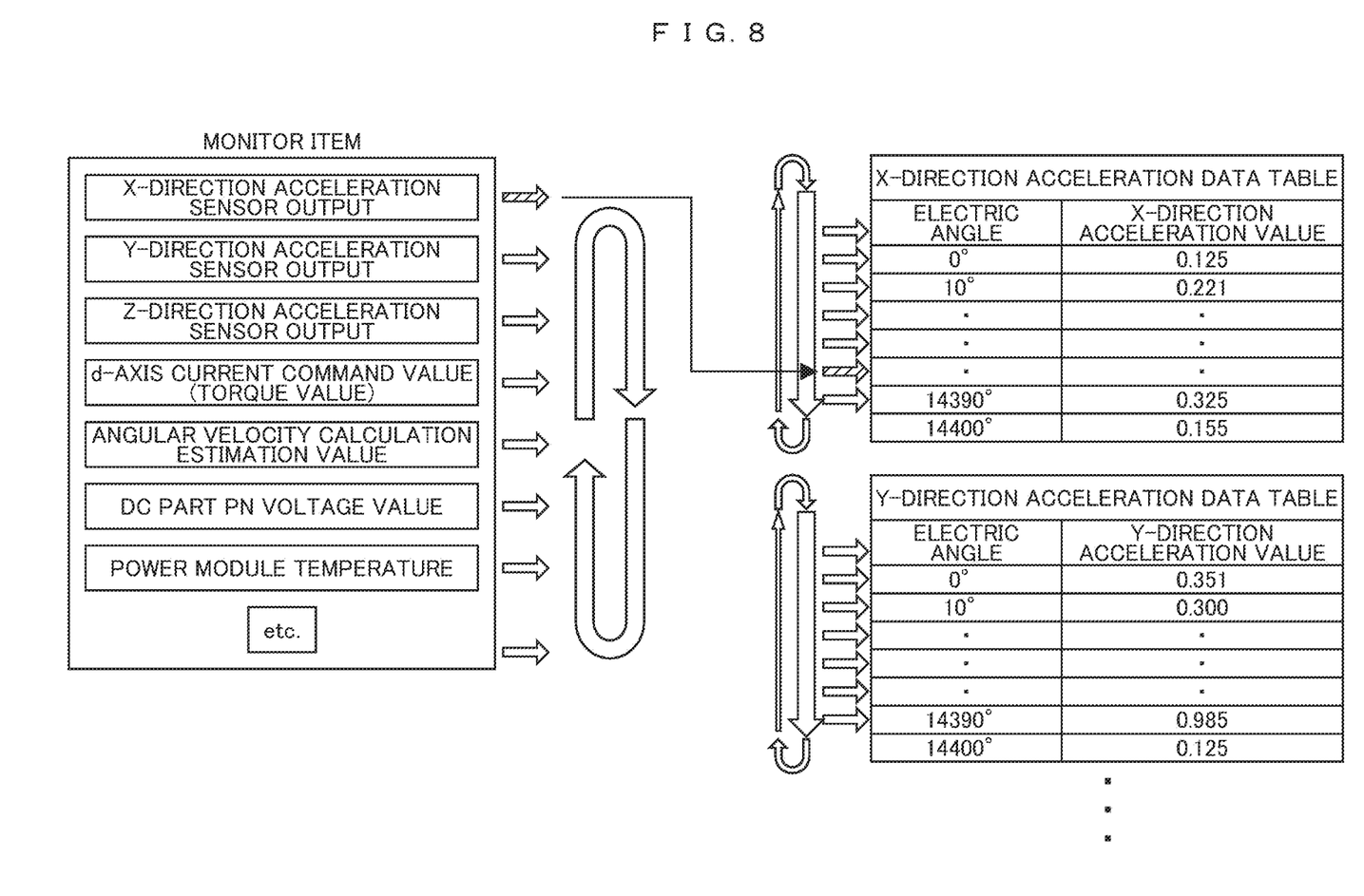
FIG. 8 is a diagram illustrating sampling of synchronous data saved in a monitor data storage unit 110 according to the present embodiment and a saving method thereof.

FIG. 8 is a diagram illustrating sampling of synchronous data saved in the monitor data storage unit 110 of FIG. 1 and a saving method thereof. As illustrated in FIG. 8, there are as many data tables as the number of monitor items, and a periodic characteristic of the machine device is taken into account in advance to perform data sampling at the electric angle for each monitor item in synchronization with a motor control phase. Examples of the monitor item include accelerations of three axes of X, Y, and Z axes, and torque values.

As described above, according to the present embodiment, for example, while a large amount of data of a vibration sensor has been conventionally sampled, and then subjected to FFT analysis to extract a frequency component, thereby estimating an abnormality occurring site, estimation and detection of an abnormal site are allowed without FFT analysis by sampling data at the electric angle in synchronization with the motor control phase.

Figure 9:
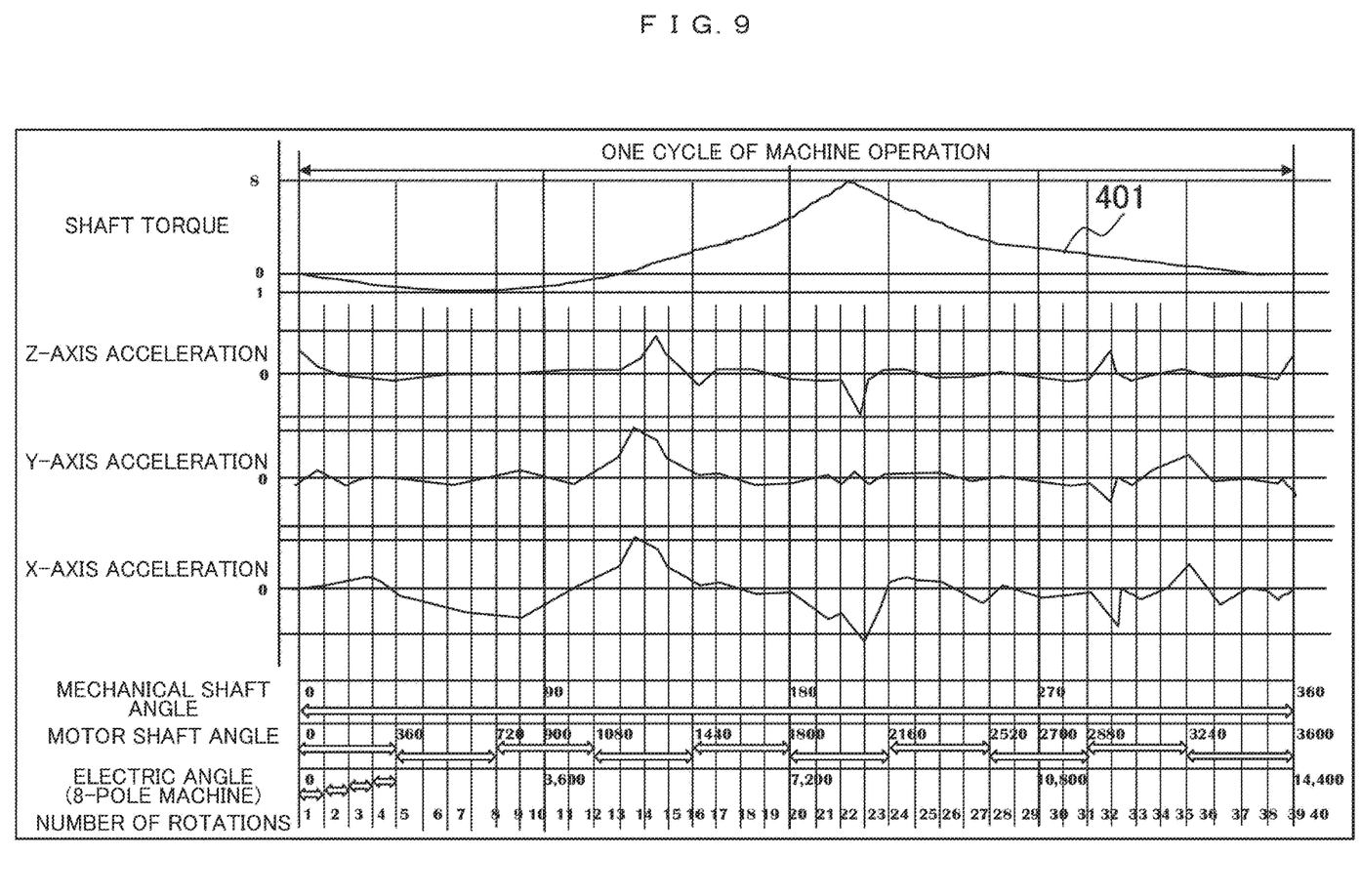
FIG. 9 is an example of synchronous sampling data according to the present embodiment and is a diagram illustrating a relationship of a torque characteristic.

FIG. 9 is an example of synchronous sampling data according to the present embodiment and illustrates a relationship between a mechanical shaft angle, a motor shaft angle, and an electric angle in one cycle of a machine operation and accelerations of three axes of X, Y, and Z axes corresponding to monitor items. Incidentally, a white arrow indicates one rotation (360°) at each angle.

Figure 10:
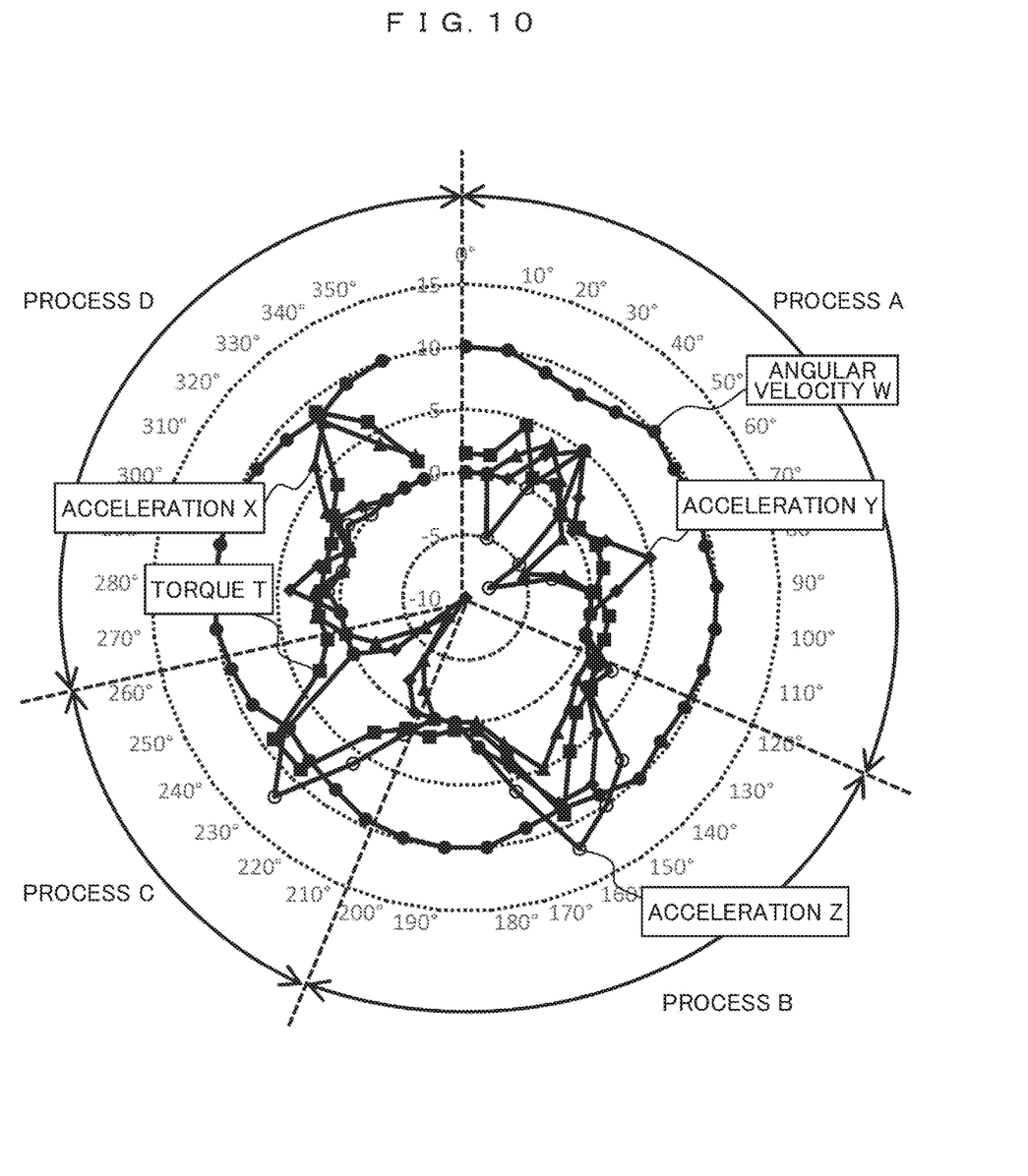
FIG. 10 is a diagram illustrating a relationship between various synchronous sampling data of one cycle of a load machine according to the present embodiment and a mechanical shaft angle.

FIG. 10 is a diagram illustrating a relationship between various synchronous sampling data of one cycle of a load machine and a mechanical shaft angle, and illustrates a behavior image of sampling data in one cycle of the load machine. In FIG. 10, the load machine is a load that performs processes A to D in one cycle and has a periodicity to repeat this operation every rotation of the mechanical shaft. Further, accelerations X, Y, and Z and torque T are sampled as sample items.

Since the electric motor that drives the load machine is a synchronous machine and there is no slip, a phase of the mechanical shaft of the driven machine device is synchronized with a phase of motor control at all times. For this reason, the electric angle under control can be associated with the phase of the mechanical shaft of the machine device. Thus, for example, the synchronous electric motor control microcomputer can obtain vibration information of the machine device from the acceleration sensor mounted on the inverter by sampling data for each controlled electric angle, and allow estimation and detection of an abnormal site of the machine device.

Incidentally, to eliminate accidental noise information, the sampled data may be averaged to estimate and detect an abnormal site when compared to a normal pattern.

In addition, since the data to be sampled has periodicity, it is possible to sample one point for each rotation of the electric angle, and it is possible to accumulate various types of synchronization data in a time division manner.

In addition, even without the acceleration sensor, it is possible to detect a temperature, a change of a load such as a torque current, etc. by a current detection unit inside the inverter.

In the present embodiment, the single-cylinder compressor has been taken as an example. However, an application attached to the electric motor is not limited thereto. It is possible to use a pump device having an impeller, a screw compressor, a scroll compressor, etc. In any application, one cycle refers to one cycle until a state on the application side is the same as an initial state where the electric motor starts rotating. In the case of a pump, a fan, etc., one cycle corresponds to a time until the impeller rotates once and reaches the same position. In the case of the scroll compressor, it is considered that one cycle corresponds to a time when a position of an orbiting scroll returns to a position at the start of operation. In other words, one rotation of the mechanical shaft on the application side corresponds to one cycle.

Figure 11:
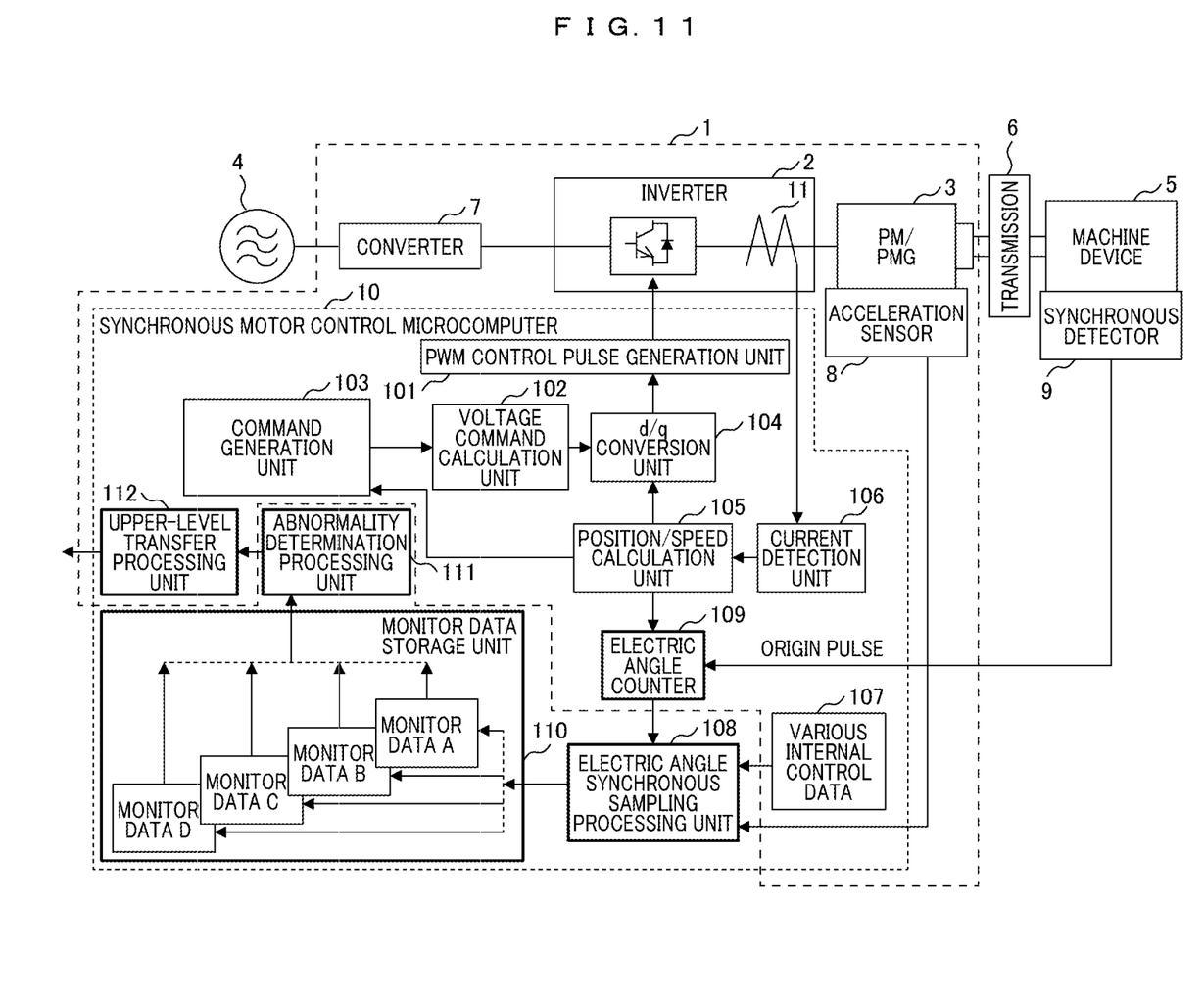
FIG. 11 is a configuration block of an electromechanical system using another rotating electric machine assembly according to the present embodiment.

Incidentally, in the present embodiment, a case in which all sampling processes are executed in the rotating electric machine as in FIG. 1 has been described. However, for example, as in FIG. 11, it is possible to adopt a configuration in which some functions of the electric angle synchronous sampling processing unit 108, the monitor data storage unit 110, the abnormality determination processing unit 111, etc. are executed outside the rotating electric machine assembly 1 via a network.

As described above, according to the present embodiment, it is possible to sample various data in synchronization with the axial phase of the machine device driven by the synchronous electric motor of the rotating electric machine assembly to perform a periodic operation. In other words, by providing a data logger function to the rotating electric machine assembly that drives the machine device, it is possible to sample various data for state monitoring synchronized with the phase of the rotating shaft of the machine device for one operation cycle of the machine device without providing detectors such as current sensors, voltage sensors, and acceleration sensors for the purpose of sign monitoring of the machine device or dedicated processing devices for analyzing such data, and without providing data analysis devices thereof, and it is possible to provide a sign monitoring means for an electromechanical system using a minimum equipment configuration.

Incidentally, the rotating electric machine assembly can be used not only for driving the machine device but also for power generation in combination with a water turbine, a windmill, etc. as power conversion machines for renewable energy, and similarly allows failure sign monitoring of these power generation systems.

REFERENCE SIGNS LIST

1 Rotating electric machine assembly
2 Inverter
3 Permanent magnet type synchronous electric motor
4 Power supply
5 Machine device
6 Transmission
7 Converter
8 Acceleration sensor
9 Synchronous detector
10 Synchronous motor control microcomputer
11 Current detector
101 PWM control pulse generation unit
102 Voltage command calculation unit
103 Command generation unit
104 d/q conversion unit
105 Position/speed calculation unit
106 Current detection unit
107 Electric motor control data
108 Electric angle synchronous sampling processing unit
109 Electric angle counter
110 Monitor data storage unit
111 Abnormality determination processing unit
112 Upper-level transfer processing unit
201 External communication interface
301 Reciprocating compressor
302 Electric motor shaft
303 Drive gear
304 Driven gear
305 Mechanical shaft
401 Torque characteristic
501 Mechanical shaft angle
502 Motor shaft angle
503 Electric angle

The invention claimed is:

1. A data obtaining method by an inverter that controls a synchronous electric motor, the method comprising:
   calculating, by a position/speed calculation unit of the inverter, an electric angle of the synchronous electric motor from a current value between the synchronous electric motor and the inverter;
   acquiring data for each electric angle as synchronous monitor data by sampling internal data present in the inverter for controlling the synchronous electric motor in synchronization with electric angle information; and
   storing the synchronization monitor data in a monitor data storage unit.

2. The data obtaining method according to claim 1, wherein the synchronous electric motor includes an acceleration sensor, and external data from the acceleration sensor is sampled in synchronization with the electric angle information, and the external data is acquired.

3. The data obtaining method according to claim 1, wherein the sampling is performed at every 360° of the electric angle.

4. The data obtaining method according to claim 1, further comprising:
determining an abnormality of the synchronization monitor data when sampling of the synchronization monitor data for one operation cycle of a machine device driven by the synchronous electric motor is completed.

5. An inverter for controlling a synchronous electric motor, the inverter comprising:
a semiconductor switching element;
a control device that controls turning ON and OFF of the semiconductor switching element; and
a current detection unit,
wherein the control device includes
a command generation unit that generates a command value,
a PWM control pulse generation unit that generates a PWM signal by a command from the command generation unit,
a position/speed calculation unit that estimates an electric angle of the synchronous electric motor using a current value from the current detection unit,
an electric angle counter that receives electric angle information from the position/speed calculation unit and outputs a trigger signal to an electric angle synchronous sampling processing unit,
the electric angle synchronous sampling processing unit that samples data using an output from the electric angle counter as a trigger signal and outputs the data as synchronization monitor data, and
a monitor data storage unit that stores the synchronization monitor data.

6. The inverter according to claim 5, further comprising:
an abnormality determination processing unit that determines an abnormality of synchronization monitor data for one operation cycle of a machine device driven by the synchronous electric motor controlled by the inverter when sampling of the data is completed; and
an upper-level transfer processing unit that transfers the synchronization monitor data to an upper-level control device when the abnormality determination processing unit determines that an abnormality is present.

7. The inverter according to claim 5, further comprising an upper-level transfer processing unit that periodically transfers, to an upper-level device, synchronization monitor data for one operation cycle of a machine device driven by the synchronous electric motor controlled by the inverter when sampling of the data is completed.

8. The inverter according to claim 5, further comprising an acceleration sensor,
wherein the electric angle synchronous sampling processing unit samples data from the acceleration sensor using an output of the electric angle counter as a trigger signal, outputs the data as synchronization monitor data, and accumulates the data in the monitor data storage unit.

9. The inverter according to claim 5, wherein an origin pulse signal from a synchronous detector of the machine device driven by the synchronous electric motor controlled by the inverter is input to the electric angle counter, and a trigger start of the synchronization monitor data is matched with an origin of the machine device.

10. The inverter according to claim 5, wherein the electric angle synchronous sampling processing unit performs the sampling at every 360° of the electric angle.

11. A rotating electric machine comprising:
a synchronous electric motor; and
an inverter that controls the synchronous electric motor,
wherein the inverter includes a semiconductor switching element, a control device that controls turning ON and OFF of the semiconductor switching element, and a current detection unit,
the control device includes
a command generation unit that generates a command value,
a PWM control pulse generation unit that generates a PWM signal by a command from the command generation unit,
a position/speed calculation unit that estimates an electric angle of the synchronous electric motor using a current value from the current detection unit,
an electric angle counter that receives electric angle information from the position/speed calculation unit and outputs the electric angle information to an electric angle synchronous sampling processing unit,
the electric angle synchronous sampling processing unit that samples data using an output from the electric angle counter as a trigger signal and outputs the data as synchronization monitor data, and
a monitor data storage unit that stores the synchronization monitor data.

* * * * *